(12) United States Patent
Yoshikawa et al.

(10) Patent No.: US 7,350,927 B2
(45) Date of Patent: Apr. 1, 2008

(54) IMAGE DISPLAY APPARATUS

(75) Inventors: Yu Yoshikawa, Yokohama (JP); Takatsugu Aizaki, Yokosuka (JP); Tetsuji Suzuki, Yokosuka (JP); Hiroshi Watanabe, Fujisawa (JP)

(73) Assignee: Victor Company of Japan, Limited, Yokohama, Kanagawa-Ken (JP)

( * ) Notice: Subject to any disclaimer, the term of this patent is extended or adjusted under 35 U.S.C. 154(b) by 249 days.

(21) Appl. No.: 11/235,200

(22) Filed: Sep. 27, 2005

(65) Prior Publication Data

US 2006/0066814 A1    Mar. 30, 2006

(30) Foreign Application Priority Data

Sep. 30, 2004 (JP) ............................ P2004-287358
Jul. 13, 2005 (JP) ............................ P2005-204033

(51) Int. Cl.
*G03B 21/28* (2006.01)
*H04N 5/64* (2006.01)

(52) U.S. Cl. ..................... 353/73; 353/98; 353/119; 348/794

(58) Field of Classification Search .......... 353/72–80, 353/98, 99, 119; 348/794, 782–789
See application file for complete search history.

(56) References Cited

U.S. PATENT DOCUMENTS 5,557,343 A * 9/1996 Yamagishi ............... 348/781
6,575,578 B2 * 6/2003 Ito ............................ 353/37
2003/0218601 A1 * 11/2003 Tsukinokizawa ......... 345/204
2005/0174546 A1 * 8/2005 Kuroda .................... 353/85
2005/0275759 A1 * 12/2005 Itohiya ..................... 348/744
2006/0007403 A1 * 1/2006 Berman ................... 353/33

FOREIGN PATENT DOCUMENTS

JP        2000-075409        3/2000

OTHER PUBLICATIONS

Meaning of Light Bulb, hyperdictionary, http://www.hyperdictionary.com/search.aspx?define=light+bulb Jul. 31, 2007.*

* cited by examiner

*Primary Examiner*—Andrew T. Sever
(74) *Attorney, Agent, or Firm*—The Nath Law Group; Jerald L. Meyer; Teresa M. Arroyo

(57) ABSTRACT

The present invention includes a reflection portion which light-modulates three primary color lights by three rectangular reflective liquid crystal light modulators, then color-combines the light-modulated lights and reflects the resultant light; and a projection lens which projects the reflected color-combined light onto a plane mirror. The three reflective light modulators are arranged in such a manner that their long side directions coincide with a perpendicular direction, and two of the three reflective light modulators are arranged in such a manner that their short side directions become parallel with a projecting direction of image light from a color separation/combination optical system.

2 Claims, 7 Drawing Sheets

IMAGE DISPLAY APPARATUS

BACKGROUND OF THE INVENTION

1. Field of the Invention

The present invention relates to an image display apparatus in which dust and the like are hardly accumulated on a light modulator and which can be reduced in size.

2. Description of the Related Art

Heretofore, a liquid crystal projector utilizing a light modulator has been present. As an image display apparatus using this liquid crystal projector, there has been known a system which projects a projection image from the liquid crystal projector onto a screen by a projection lens through a plurality of deflecting mirrors.

For example, Japanese Patent Application Laid-open No. 2000-75409 discloses an image display apparatus in which a box member accommodates a reflective light modulator; a color separation/combination optical system which color-separates light emitted from a light source into three primary color lights, then modulates and color-combines these lights by the reflective light modulator to emit image light; a projection lens which leads the image light emitted from the color separation/combination optical system to a screen; first and second deflecting mirrors; and the screen.

In this type of image display apparatus, when dust and the like in air are accumulated on a surface of the reflective light modulator, optical performance of the reflective light modulator deteriorates. Furthermore, there is a problem that reduction in size of the unit is impossible, depending on an arrangement of the color separation/combination optical system or the projection lens.

SUMMARY OF THE INVENTION

Therefore, the present invention is proposed in view of the above-described problem, and it is an object of the present invention to provide an image display apparatus in which dust and the like are hardly accumulated on a reflective liquid crystal light modulator and which can be reduced in size.

To achieve the above object, according to an aspect of the present invention, there is provided an image display apparatus which displays a projection image onto a screen, comprising: generating means for generating three primary color lights; three rectangular reflective light modulators which light-modulate the respective three primary color lights in accordance with an image signal; a color combination optical system which combines emitted lights light-modulated and reflected by the three reflective light modulators and emits the combined light as image light therefrom; a reflection portion which reflects the image light; a projection lens which projects the image light reflected by the reflection portion; and a plane mirror which is arranged at a predetermined angle with respect to the screen and reflects the image light projected by the projection lens in a direction of the screen, wherein the three reflective light modulators are arranged in such a manner that their long side directions coincide with a perpendicular direction, and two of the three reflective light modulators are arranged in such a manner that their short side directions become parallel with an emitting direction of the image light from the color combination optical system.

In a preferred embodiment of the present invention, when the predetermined angle is $\theta_M$ ($\theta_M<45°$), a longitudinal direction of the screen is a Y axis, a lateral direction of the same is an X axis, a vertical direction of the same is a Z axis, a rectangular coordinate in which an original point is a center of the reflection portion is set, an incident light axis of the image light entering the reflection portion is in an XZ plane formed by the X axis and the Z axis, an angle formed by the incident light axis and the X axis is $\theta_1$ (a positive angle larger than 0°), an emitting light axis of the image light reflected by the reflection portion is in a YZ plane formed by the Y axis and the Z axis, and an angle formed by the emitting light axis and the Y axis is $\theta_2$ (a positive angle larger than 0°), the reflection portion is arranged so that a perpendicular line extending to the reflection portion is in an XY plane formed by the X axis and the Y axis, so that an angle of 45° is formed by the perpendicular line and the Y axis, and so that a plane formed by the incident light axis and the emitting light axis has a predetermined angle with respect to the screen, and relations of $\theta_2=90-2\theta_M$ and $\theta_1=\theta_2$ are satisfied.

In a preferred embodiment according to the present invention, a reflecting mirror which reflects the image light combined by the color combination optical system in a direction of the incident light axis is arranged between the color combination optical system and the reflection portion.

According to the present invention, since the three reflective liquid crystal light modulators are arranged in such a manner that their long side directions coincide with the perpendicular direction, dust and the like are hardly accumulated on a surface of each reflective liquid crystal light modulator. Further, two of the three reflective liquid crystal light modulators are arranged in such a manner that their long side directions coincide with the perpendicular direction and their short side directions become parallel with an emitting direction of the image light, thereby shortening back-focus of the projection lens. Furthermore, when the relations of $\theta_2=90-2\theta_M$ and $\theta_1=\theta_2$ are satisfied between the angles $\theta_M$, $\theta_1$ and $\theta_2$, a protruding length of the plane mirror in a back surface direction can be shortened, thereby reducing a size of the unit.

The nature, principle and utility of the invention will become more apparent from the following detailed description when read in conjunction with the accompanying drawings.

DETAILED DESCRIPTION OF THE PREFERRED EMBODIMENTS

Embodiments of an image display apparatus according to the present invention will now be described hereinafter in detail with reference to the accompanying drawings.

First Embodiment

Figure 1:
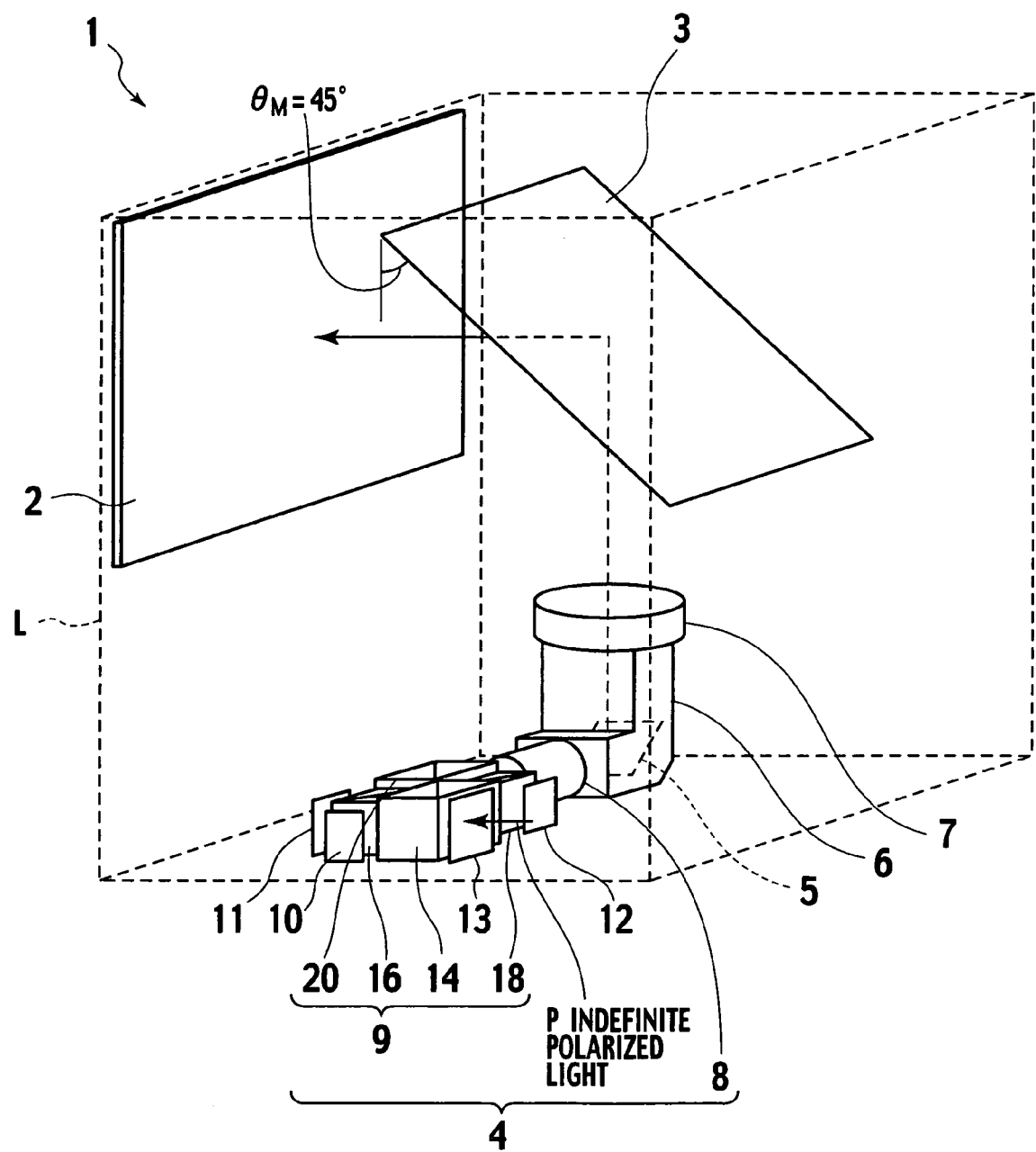
FIG. 1 is a perspective view showing an embodiment of an image display apparatus according to the present invention.
Figure 2:
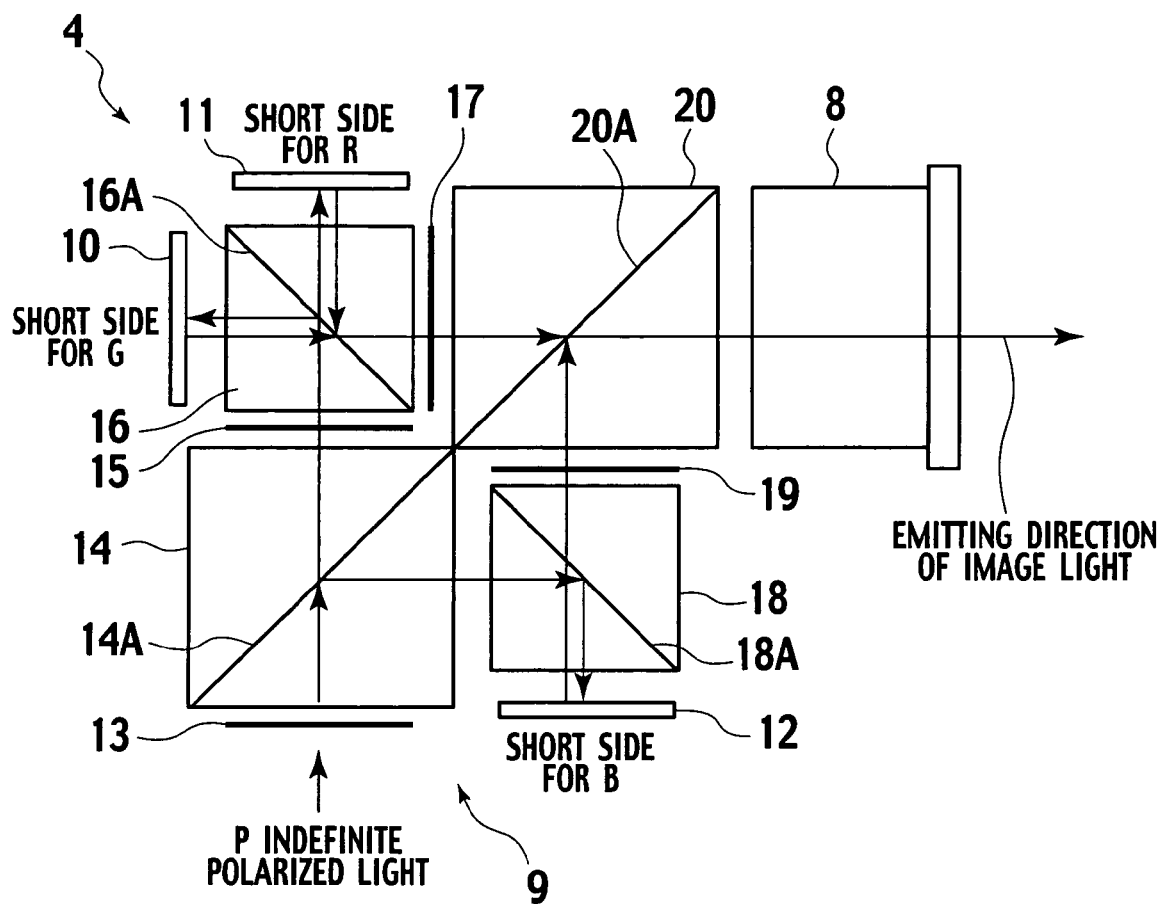
FIG. 2 is a view illustrating a configuration of a liquid crystal projector.
Figure 3:
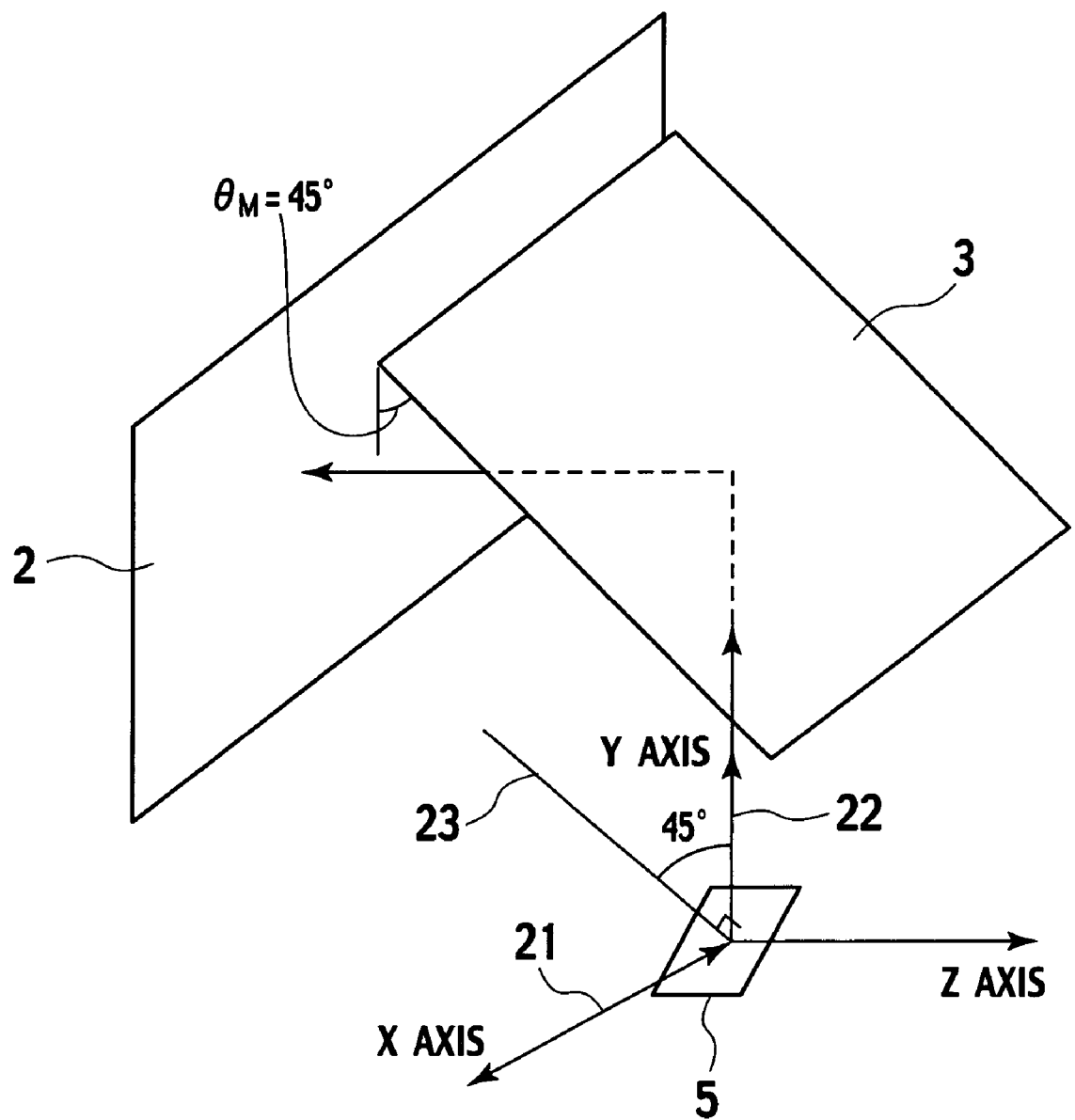
FIG. 3 is a view illustrating an arrangement of a reflecting mirror according to a first embodiment.

FIG. 1 is a perspective view showing a first embodiment of an image display apparatus according to the present invention. FIG. 2 is a view illustrating a configuration of a liquid crystal projector. FIG. 3 is a view illustrating an arrangement of a reflecting mirror according to the first embodiment.

In FIG. 1, constituent components accommodated in a box member L are indicated by solid lines, and a box member L is indicated by broken lines for the convenience's sake.

As shown in FIG. 1, an image display apparatus 1 according to the first embodiment of the present invention comprises: a plane mirror 3 arranged at an angle $\theta_M=45°$ with respect to a screen 2; a liquid crystal projector 4 arranged between the screen 2 and the plane mirror 3; a reflecting mirror 5 which reflects image light emitted from the liquid crystal projector 4; a light guiding tube 6 in which the reflecting mirror 5 is accommodated; and a projection lens 7 which projects the image light reflected by the reflecting mirror 5 onto the plane mirror 3. The screen 2, the plane mirror 3, the liquid crystal projector 4, the reflecting mirror 5, the light guiding tube 6 and the projection lens 7 are accommodated in the box member L.

Moreover, the liquid crystal projector 4 comprises: a projection lens 8; a color separation/combination optical system 9; and RGB reflective light modulators 10, 11 and 12.

As shown in FIG. 2, the color separation/combination optical system 9 comprises: a wavelength selective wave plate 13; a first polarizing beam splitter 14 having a separation film 14A; a G wavelength selective wave plate 15; a second polarizing beam splitter 16 having a separation film 16A; an R wavelength selective wave plate 17; a third polarizing beam splitter 18 having a separation film 18A; a B wavelength selective wave plate 19; and a fourth polarizing beam splitter 20 having a separation film 20A.

The wavelength selective wave plate 13 changes R light (red light) and G light (green light) alone as incident indefinite polarized lights P into P polarized lights, and transmits B light (blue light) as S polarized light therethrough without change. The first polarizing beam splitter 14 transmits the R and G lights changed into the P polarized lights by the wavelength selective wave plate 13 therethrough, and reflects the B light as the S polarized light by the separation film 14A. The G wavelength selective wave plate 15 transmits the R light as the P polarized light therethrough among the R and G lights as the P polarized lights transmitted through the first polarizing beam splitter 14, and changes a polarized light plane of the G light into the S polarized light from the P polarized light.

The second polarizing beam splitter 16 transmits the R light as the P polarized light transmitted through the G wavelength selective wave plate 15 therethrough, and uses the separation film 16A to reflect the R light which has been changed into the S polarized light by light modulation in the R reflective liquid crystal light modulator 11 arranged in a transmission direction for the R light as the P polarized light. On the other hand, the second polarizing beam splitter 16 uses the separation film 16A to reflect the G light which has been turned into the S polarized light by the G wavelength selective wave plate 15, and transmits the G light which has been turned into the P polarized light by light modulation in the G reflective liquid crystal light modulator 10 arranged in a reflection direction of the separation film 16A therethrough.

The R wavelength selective wave plate 17 changes a polarized light plane of the S polarized light of the R light into the P polarized light among the G light as the P polarized light transmitted through the second polarizing beam splitter 16 and the R light as the S polarized light reflected by the separation film 16A, and transmits the obtained P polarized light together with the G light as the P polarized light therethrough.

The third polarizing beam splitter 18 uses the separation film 18A to reflect the B light as the S polarized light reflected by the separation film 14A of the first polarizing beam splitter 14, and transmits the B light which has been changed into the P polarized light by light modulation in the B reflective liquid crystal light modulator 12 arranged in a reflection direction of the separation film 18A therethrough.

The B wavelength selective wave plate 19 changes a polarized light plane of the B light as the P polarized light transmitted through the third polarizing beam splitter 18 into the S polarized light and transmits the obtained light therethrough.

The fourth polarizing beam splitter 20 transmits the R and G lights as the P polarized lights transmitted through the R wavelength selective wave plate 17, reflects on the separation film 20A the B light as the S polarized light transmitted through the B wavelength selective wave plate 19, color-combines the R and G lights as the P polarized lights and the B light as the S polarized light, and emits the resultant light as image light therefrom.

The projection lens 8 projects the image light emitted from the fourth polarizing beam splitter 20 onto the reflecting mirror 5.

Here, each of the RGB reflective liquid crystal light modulators 10, 11 and 12 has a rectangular shape. Additionally, the G reflective liquid crystal light modulator 10 is arranged so as to face a surface of the second polarizing beam splitter 16 from which the G light as the S polarized light reflected by the separation film 16A is emitted in such a manner that a long side direction of the G reflective liquid crystal light modulator 10 coincides with a perpendicular direction.

The R reflective liquid crystal light modulator 11 is arranged to face a surface of the second polarizing beam splitter 16 from which the R light as the P polarized light transmitted through the separation film 16A is emitted in such a manner that a long side direction of the R reflective liquid crystal light modulator 11 coincides with the perpendicular direction and a short side direction of the same becomes parallel with an emitting direction of the image light. The B reflective liquid crystal light modulator 12 is arranged to face a surface of the third polarizing beam splitter 18 from which the B light as the S polarized light reflected by the separation film 18A is emitted in such a manner that a long side direction of the B reflective liquid crystal light modulator 12 coincides with the perpendicular direction and a short side direction of the same becomes parallel with the emitting direction of the image light.

An arrangement of the reflecting mirror 5 will now be described.

As shown in FIG. 3, assuming that a longitudinal direction of the screen 2 is a Y axis, a lateral direction of the same is an X axis, a vertical direction of the same is a Z axis and a rectangular coordinate is set with an original point being determined as a center of the reflecting mirror 5, the reflecting mirror 5 is arranged in such a manner that an incident light axis 21 of the image light projected from the projection lens 8 is parallel with the X axis and an emitting light axis 22 of the same is parallel with the Y axis.

A perpendicular line 23 extending to the reflecting mirror 5 is within an XY plane and an angle formed between the perpendicular line and the Y axis is 45°. Additionally, the XY plane is a plane parallel with the screen 2, and an XZ plane and a YZ plane are planes orthogonal to the screen 2.

Since the plane mirror 3 is arranged at an angle of $\theta_M=45°$ with respect to the screen 2, the image light reflected by the plane mirror 3 is emitted in a direction perpendicular to the screen 2. Further, since the incidence light axis 21 is parallel with the X axis and the emitting light axis 22 is parallel with the Y axis, the image light projected onto the screen 2 is set in a normal position without rotating.

An operation of the image display apparatus will now be described with reference to FIGS. 1 and 2.

As shown in FIG. 2, the indefinite polarized light P is changed into the R and G lights as the P polarized lights and the B light as the S polarized light by the wavelength selective wave plate 13 of the color separation/combination optical system 9, and the obtained lights are transmitted as they are and enter the first polarizing beam splitter 14. The R and G lights as the P polarized lights are transmitted through the first polarizing beam splitter 14 and enter the G wavelength selective wave plate 15. The B light as the S polarized light is reflected by the separation film 14A and enters the third polarizing beam splitter 18.

Of the R and G lights transmitted through the first polarizing beam splitter 14, the polarized light plane of the G light is changed into the S polarized light from the P polarized light by the G wavelength selective wave plate 15 and, on the other hand, the R light is transmitted through the G wavelength selective wave plate 15 as it is and enters the second polarizing beam splitter 16.

Furthermore, the R light as the P polarized light is transmitted through the second polarizing beam splitter 16 as it is and enters the R reflective liquid crystal light modulator 11. The G light as the S polarized light is reflected by the separation film 16A of the second polarizing beam splitter 16, and enters the G reflective liquid crystal light modulator 10.

The G light as the S polarized light is light-modulated into the P polarized light in the G reflective liquid crystal light modulator 10, and then transmitted through the separation film 16A of the second polarizing beam splitter 16. On the other hand, the R light as the P polarized light is light-modulated into the S polarized light in the R reflective liquid crystal light modulator 11, then reflected by the separation film 16A of the second polarizing beam splitter 16, and enters the R wavelength selective wave plate 17. Of the G light as the P polarized light transmitted through the separation film 16A and the R light as the S polarized light reflected by the separation film 16A, the polarized light plane of the R light is changed into the P polarized light from the S polarized light and, on the other hand, the G light as the P polarized light is transmitted through the R wavelength selective wave plate 17 as it is and enters the fourth polarizing beam splitter 20.

The B light as the S polarized light reflected by the separation film 14A of the first polarizing beam splitter 14 is reflected by the separation film 18A of the third polarizing beam splitter 18 and enters the B reflective liquid crystal light modulator 12. Moreover, the B light as the S polarized light is light-modulated into the P polarized light in the B reflective liquid crystal light modulator 12, then transmitted through the separation film 18A of the third polarizing beam splitter 18, and enters the B wavelength selective wave plate 19.

The polarized light plane of the B light as the P polarized light transmitted through the separation film 18A is changed into the S polarized light, and then the B light enters the fourth polarizing beam splitter 20.

The R and G lights as the P polarized lights transmitted through the R wavelength selective wave plate 17 are transmitted through the separation film 20A of the fourth polarizing beam splitter 20, and the B light as the S polarized light emitted from the B wavelength selective wave plate 19 is reflected by the separation film 20A to enter the projection lens 8. The projection lens 8 color-combines the R and G lights as the P polarized lights and the B light as the S polarized light, and projects the resultant light as image light onto the reflecting mirror 5.

Furthermore, as shown in FIG. 1, the image light reflected by the reflecting mirror 5 is projected onto the plane mirror 3 by the projection lens 7, reflected by this plane mirror 3, and enters the screen 2 in a direction orthogonal to the screen 2, thereby displaying an image thereon.

As a result, an image formed by the RGB reflective light modulators 10, 11 and 12 is magnified and projected on the screen 2 in a normal position.

As described above, according to the first embodiment of the present invention, since the RGB reflective liquid crystal light modulators 10, 11 and 12 arranged to face the second polarized beam splitter 16 and the third polarizing beam splitter 18 are arranged in such a manner that their long side directions face the perpendicular direction, dust and the like can be hardly accumulated on surfaces of the reflective liquid crystal light modulators 10, 11 and 12.

Furthermore, since the R reflective liquid crystal light modulator 11 arranged to face the second polarizing beam splitter 16 and the B reflective liquid crystal light modulator 12 arranged to face the third polarizing beam splitter 18 are arranged in such a manner that their long side directions coincide with the perpendicular direction and their short side directions become parallel with an emitting direction of the image light, back-focus of the projection lens 8 can be shortened.

Moreover, since the plane mirror 3 is arranged at an angle $\theta_M=45°$ with respect to the screen 2, the image light projected from the projection lens 7 can be set in a normal position without rotating.

Second Embodiment

A second embodiment according to the present invention will now be described with reference to FIGS. 4 and 5.

Figure 4:
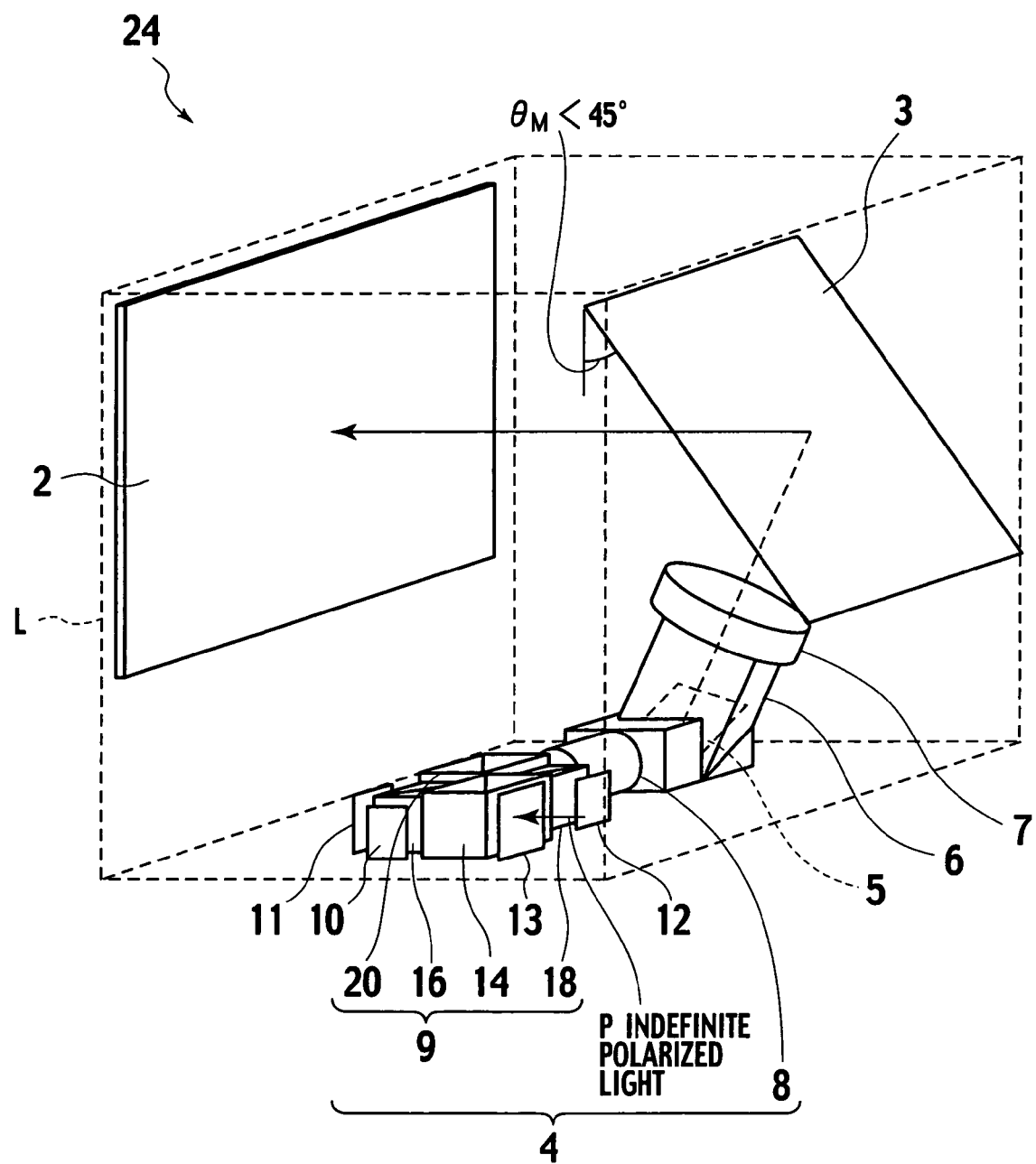
FIG. 4 is a perspective view showing a second embodiment of the image display apparatus according to the present invention.

FIG. 4 is a perspective view showing a second embodiment of the image display apparatus according to the present invention. FIG. 5 is a view illustrating an arrangement of a reflecting mirror according to the second embodiment.

In FIG. 4, constituent components accommodated in a box member L are indicated by solid lines, and the box member L is indicated by broken lines for the convenience's sake.

Like reference numerals denote structures equal to those in the first embodiment, thereby eliminating their explanation.

As shown in FIG. 4, an image display apparatus 24 according to the second embodiment of the present invention has a plane mirror 3 arranged at an angle $\theta_M<45°$ with respect to the screen 2 in the image display apparatus 1 in the first embodiment. Moreover, as shown in FIG. 5, an incident light axis 21 of image light which falls on a reflecting mirror 5 is within an XZ plane formed by an X axis and a Z axis, and an angle $\theta_1$ formed by the incident light axis 21 and the X axis is a predetermined acute angle. Additionally, an emitting light axis 22 of the image light reflected by the reflecting mirror 5 is within a YZ plane formed by a Y axis and the Z axis, and an angle $\theta_2$ formed by the emitting light axis 22 and the Y axis is a predetermine acute angle. As a result, a protruding length of the plane mirror 3 in a back surface direction of the box member L is shortened to entirely reduce a size of the unit including the box member L, and any other structure is the same as the foregoing embodiment.

In this example, the angles $\theta_1$, $\theta_2$ and $\theta_M$ have relations of $\theta_2 = 90° - 2\theta_M$ and $\theta_1 = \theta_2$. The relation of $\theta_2 = 90° - 2\theta_M$ is satisfied, whereby the image light reflected by the plane mirror 3 is emitted in a direction vertical to the screen 2, and the relation of $\theta_1 = \theta_2$ is satisfied in order to set the image light projected onto the screen 2 in a normal position without rotating.

Since an operation of this image display apparatus 24 is the same as that in the first embodiment, its description will be eliminated.

According to the second embodiment of the present invention, in addition to the effect of the first embodiment, the plane mirror 3 is arranged at an angle of $\theta_M < 45°$ with respect to the screen 2, thereby further reducing a size of the unit.

Third Embodiment

A third embodiment according to the present invention will now be described with reference to FIG. 6.

Figure 6:
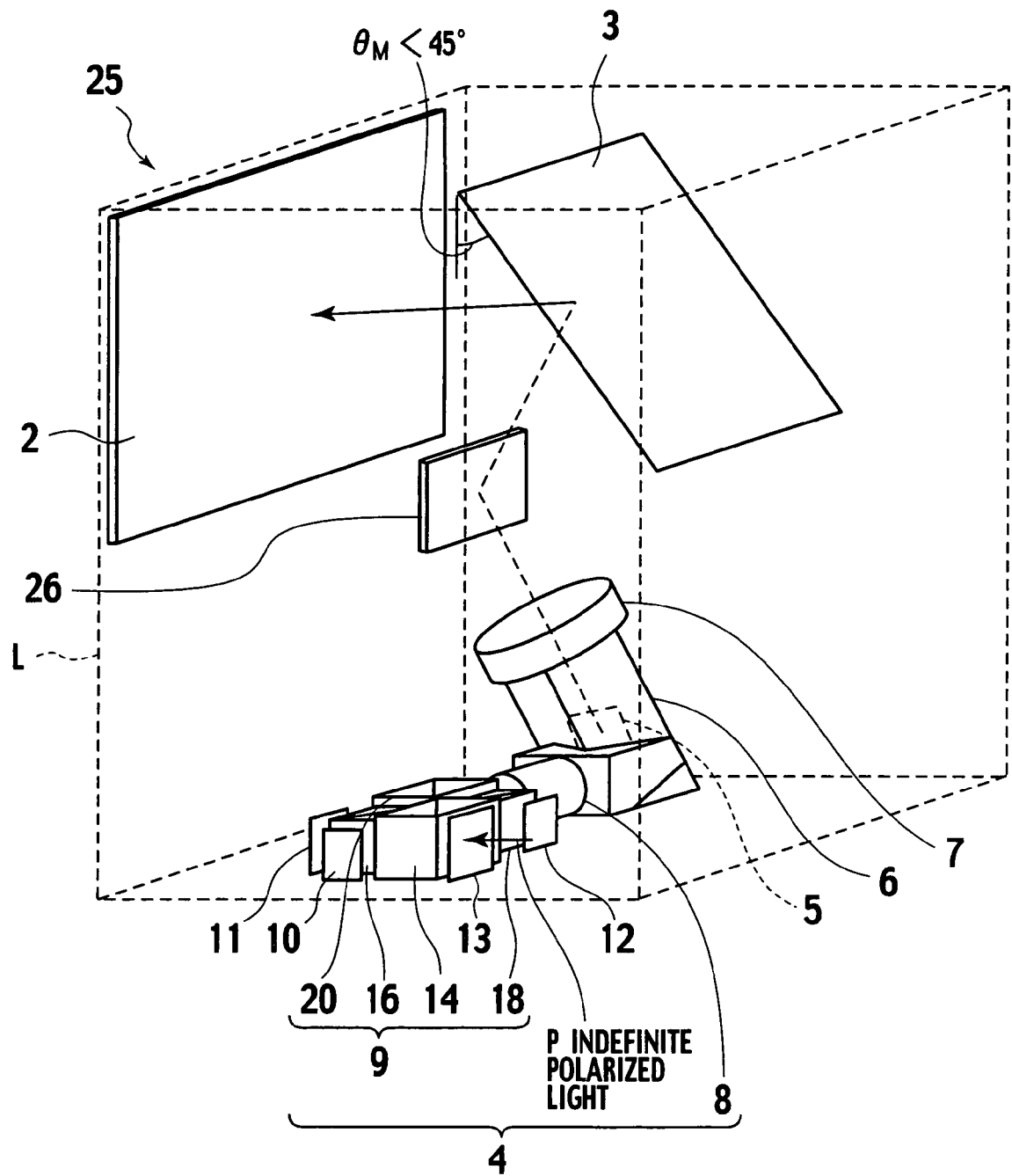
FIG. 6 is a perspective view showing a third embodiment of the image display apparatus according to the present invention.

FIG. 6 is a perspective view showing a third embodiment of the image display apparatus according to the present invention.

In FIG. 6, constituent components accommodated in a box member L are indicated by solid lines, and the box member L is indicated by broken lines for the convenience's sake.

As shown in FIG. 6, an image display apparatus 25 according to the third embodiment of the present invention has a plane mirror 26 arranged between the projection lens 7 and the plane mirror 3 in the image display apparatus 24 according to the second embodiment, and any other configuration is the same as the foregoing embodiment.

According to the third embodiment of the present invention, since the plane mirror 26 is required; the number of components is increased. However, since image light projected from the projection lens 7 is once reflected by the plane mirror 26 to enter the plane mirror 3, an incidence angle of the image light with respect to the plane mirror 3 can be arbitrarily changed, thereby reducing a size of the unit with a higher degree of freedom than that of the second embodiment.

Fourth Embodiment

A fourth embodiment according to the present invention will now be described with reference to FIGS. 5 and 7.

Figure 7:
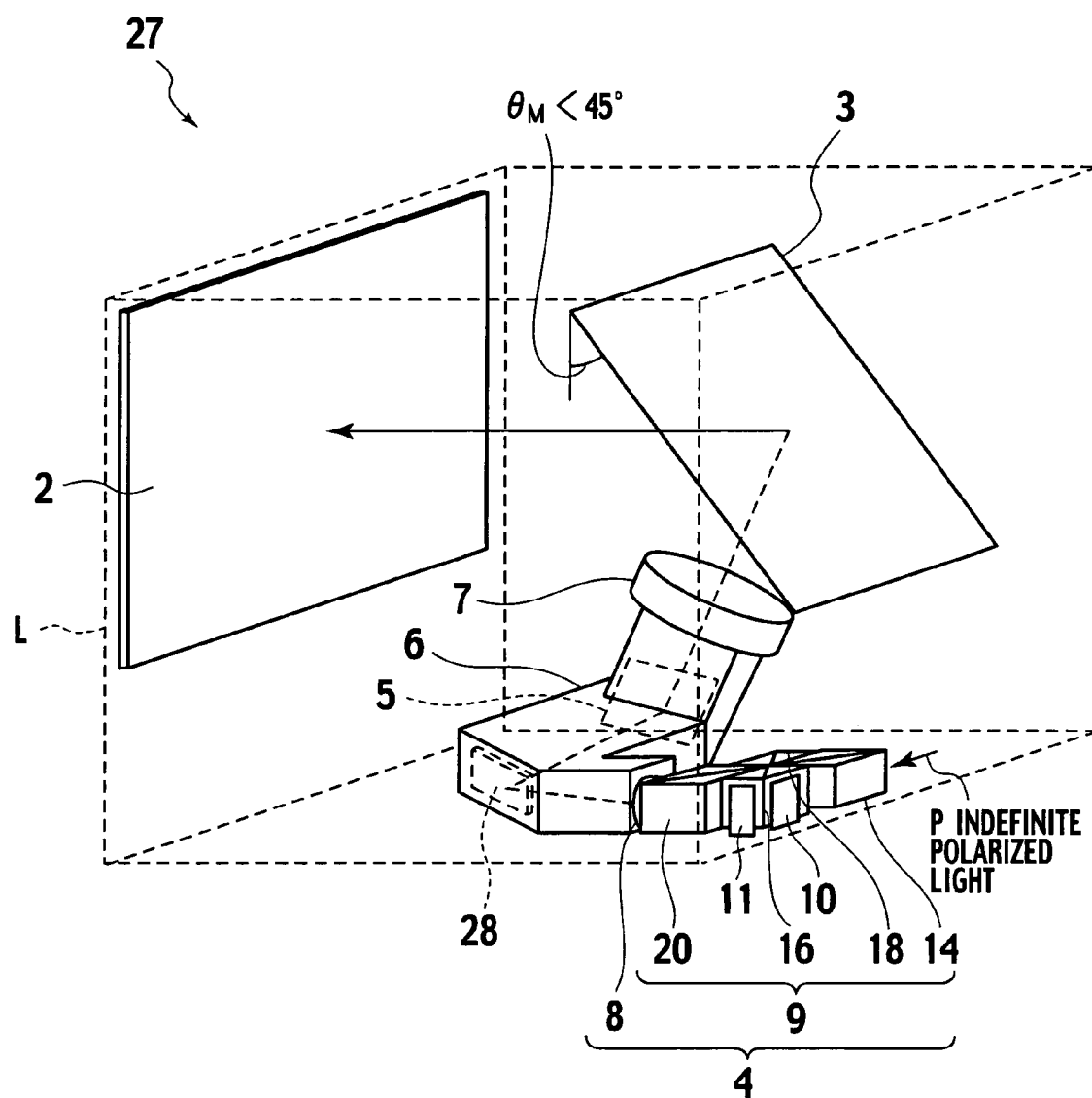
FIG. 7 is a perspective view showing a fourth embodiment of the image display apparatus according to the present invention.

FIG. 7 is a perspective view showing the fourth embodiment of the image display apparatus according to the present invention.

In FIG. 7, constituent components accommodated in a box member L are indicated by solid lines, and the box member L is indicated by broken lines.

As shown in FIG. 7, an image display apparatus 27 according to the fourth embodiment has a configuration where a reflecting mirror 28 which reflects image light projected from the projection lens 8 is arranged between the projection lens 8 and the reflecting mirror 5 of the liquid crystal projector 4 in the image display apparatus 25 according to the second embodiment, and any other configuration is the same as the foregoing embodiment.

Figure 5:
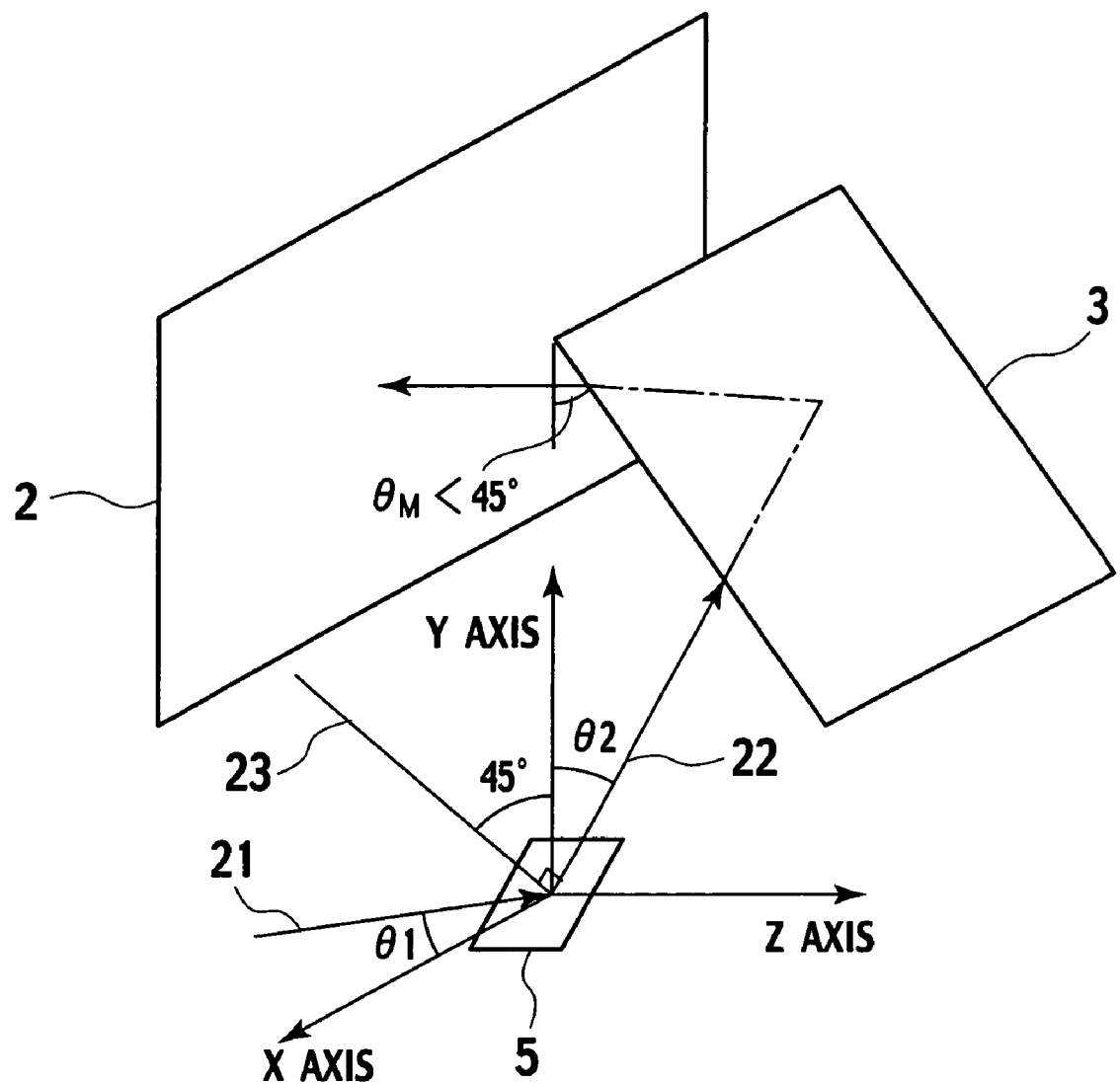
FIG. 5 is a view illustrating an arrangement of a reflection mirror according to the second embodiment.

According to the fourth embodiment, an angle $\theta_1$ formed by the incident light axis 21 shown in FIG. 5 and the X axis can be freely selected based on an arrangement angle of the reflecting mirror 28, thereby increasing the degree of freedom of reduction in size of the unit.

It is to be noted that a prism may be used in place of the reflecting mirror 5 described in conjunction with the first to fourth embodiments. The plurality of reflecting mirrors 28 may be used, or a spherical mirror or a non-spherical mirror may be used as the reflecting mirror 28. Further, the same effect can be obtained even if the box member L is not provided. Furthermore, each of the angles $\theta_1$ and $\theta_2$ is an acute angle or 0° in the foregoing embodiments. However, when the reflecting mirror 5 is rotated 90° around the Z axis and a reflecting plane of the reflecting mirror 5 is set on a −X axis side without changing the rectangular coordinate, each of the angles $\theta_1$ and $\theta_2$ is indicated as an acute angle. Therefore, the arrangement of each of the foregoing embodiment is just an example, and the present invention is not restricted thereto.

In the first to fourth embodiments, white light is color-separated by use of the color separation/combination optical system 9 to generate the R, G and B lights, but as generating means for the R, G and B lights, there may be used three color LEDs which independently emit the R, G and B lights. In this case, a simple color combination optical system is used in place of the color separation/combination optical system 9.

It should be understood that many modifications and adaptations of the invention will become apparent to those skilled in the art and it is intended to encompass such obvious modifications and changes in the scope of the claims appended hereto.

What is claimed is:

1. An image display apparatus which displays a projection image onto a screen, comprising:

generating means for generating three primary color lights;

three rectangular reflective light modulators which light-modulate the respective three primary color lights in accordance with an image signal;

a color combination optical system which combines emitted lights light-modulated and reflected by the three reflective light modulators and emits the combined light as image light;

a reflection portion which reflects the image light;

a projection lens which projects the image light reflected by the reflection portion; and a plane mirror which is arranged at a predetermined angle with respect to the screen and reflects the image light projected by the projection lens in a direction of the screen, wherein the three reflective light modulators are arranged in such a manner that their long side directions coincide with a perpendicular direction, and two of the three reflective light modulators are arranged in such a manner that their short side directions become parallel with an emitting direction of the image light from the color combination optical system, wherein, when the predetermined angle is $\theta_M$ ($\theta_M < 45°$), a longitudinal direction of the screen is a Y axis, a lateral direction of the same is an X axis, a vertical direction of the same is a Z axis, a rectangular coordinate in which an original point is a center of the reflection portion is set, an incident light axis of the image light entering the reflection portion is in an XZ plane formed by the X axis and the Z axis, an angle formed by the incident light axis and the X axis is $\theta_1$ (a positive angle larger than 0°), an emitting light axis of the image light reflected by the reflection portion is in a YZ plane formed by the Y axis and the Z axis, and an angle formed by the emitting light axis and the Y axis is $\theta_2$ (a positive angle larger than 0°), the reflection portion is arranged so that a perpendicular line extending to the reflection portion is in an XY plane formed by the X axis and the Y axis, so that an angle of 45° is formed by the perpendicular line and the Y axis, and so that a plane formed by the incident light axis and the emitting light axis has a predetermined angle with respect to the screen, and relations of $\theta_2 = 90 - 2\theta_M$ and $\theta_1 = \theta_2$ are satisfied.

2. The image display apparatus according to claim 1, wherein a reflecting mirror which reflects the image light combined by the color combination optical system in a direction of the incident light axis is arranged between the color combination optical system and the reflection portion.

* * * * *